(12) United States Patent
Hsieh et al.

(10) Patent No.: US 8,662,860 B2
(45) Date of Patent: Mar. 4, 2014

(54) MICROFLUIDIC DRIVING SYSTEM

(75) Inventors: Wen-Hsin Hsieh, Taipei (TW); Jhih-Lin Chen, Taoyuan (TW); Wei-Hung Shih, Kaohsiung (TW)

(73) Assignee: National Chung Cheng University (TW)

( * ) Notice: Subject to any disclaimer, the term of this patent is extended or adjusted under 35 U.S.C. 154(b) by 812 days.

(21) Appl. No.: 12/754,092

(22) Filed: Apr. 5, 2010

(65) Prior Publication Data

US 2011/0155565 A1 Jun. 30, 2011

(30) Foreign Application Priority Data

Dec. 31, 2009 (TW) ................................ 98146342 A

(51) Int. Cl.
*F04F 99/00* (2009.01)

(52) U.S. Cl.
USPC ............... 417/48; 417/50; 204/600; 204/643; 422/502

(58) Field of Classification Search
CPC ................ F04B 19/0006; B01L 2200/026
USPC .......... 417/48, 49, 50, 63; 204/450, 600, 601, 204/451, 547, 643; 435/286.1–286.5, 435/286.7; 436/149, 150; 422/50, 82.01, 422/500–502, 504, 517, 105
See application file for complete search history.

(56) References Cited

U.S. PATENT DOCUMENTS

| | | | | |
|---|---|---|---|---|
| 6,154,226 A | * | 11/2000 | York et al. | 346/140.1 |
| 6,761,811 B2 | * | 7/2004 | Mariella, Jr. | 204/547 |
| 7,531,072 B2 | * | 5/2009 | Roux et al. | 204/450 |
| 7,708,873 B2 | * | 5/2010 | Bazant et al. | 204/451 |
| 7,942,643 B2 | * | 5/2011 | Cho et al. | 417/207 |
| 8,182,669 B2 | * | 5/2012 | Mezic et al. | 204/547 |
| 8,349,275 B2 | * | 1/2013 | Wang et al. | 422/503 |
| 2003/0164296 A1 | * | 9/2003 | Squires et al. | 204/450 |
| 2003/0224528 A1 | * | 12/2003 | Chiou et al. | 436/164 |
| 2006/0097155 A1 | * | 5/2006 | Adachi et al. | 250/288 |
| 2006/0194331 A1 | * | 8/2006 | Pamula et al. | 436/150 |
| 2008/0000772 A1 | * | 1/2008 | Bazant et al. | 204/450 |
| 2009/0127113 A1 | * | 5/2009 | Chen et al. | 204/403.01 |
| 2010/0187115 A1 | * | 7/2010 | Posner et al. | 204/627 |

* cited by examiner

*Primary Examiner* — Charles Freay
*Assistant Examiner* — Joseph Herrmann
(74) *Attorney, Agent, or Firm* — Harness, Dickey & Pierce, PLC

(57) ABSTRACT

A microfluidic driving system includes a first planar electrode, a second planar electrode, a third planar electrode, a fourth planar electrode, a power supply unit and a detection module. The second, third and fourth planar electrodes are disposed parallel to the first planar electrode and face-to-face with the first planar electrode to form an accommodation space for accommodating a fluid. An AC power is provided by the power supply unit and an AC electrical field is applied by alternately connecting the third planar electrode and the fourth planar electrode with the first planar electrode for driving the first fluid and the second fluid to flow; and then AC electrical field is also applied by connecting the second planar electrode to the first planar electrode to mix the first fluid and the second fluid. Finally, a detection is performed upon a mixture of the fluids through the detection module.

10 Claims, 14 Drawing Sheets

MICROFLUIDIC DRIVING SYSTEM

BACKGROUND

The present invention herein relates to a microfluidic driving system, and more particularly to a technology for fluid control by means of the microfluidic driving system.

Recently, the development of Micro Electro Mechanical Systems (MEMS) technology makes many large components become miniaturized. Within numerous research fields of the MEMS technology, what calls for particular attention is that microfluidic devices are applied to biomedical detections. The microfluidic biomedical detection chips produced by the MEMS technology not only have the advantages of high detection performance, low sample consumption, low energy, small size, and low production cost brought by the MEMS batch process, but also have the advantages of productions of low-cost disposable chips in order to reduce cross-contamination. Furthermore, with regards to a micro total analysis system (μ-TAS) having integrated micro fluidics, real-time response and simultaneous analysis, its development potential as well as its application value cannot be ignored. The production of the micro total analysis system will bring a great change in human life. The portable detection module of the system not only can be used on personal physical analysis anytime and anywhere, but also can be used on environmental detections, food testing, as well as various kinds of chemical analyses. The system is fast and time-saving, and it can be easily identified if only a small number of samples is required, which is quite environment-friendly.

For the micro total analysis system, a microfluidic driving system plays an indispensable component. Recently, the electroosmotic flow of the fluid driven by means of an induction electric field is highlighted for special attention by public research institutes due to no mechanical components being required to promote the fluid, which has a simple production and can be combined with the microfluidic systems easily. DC electroosmotic flows often require thousands of volts of high-voltage electric fields, and thus electrolytic reactions are easily produced to cause bubbles, which limit promotions and applications of the DC electroosmotic flows. AC electroosmotic flows generated by induced polarization charges have been proved to effectively avoid bubbles. This is because the AC electric field can control its frequency to be much greater than the inverse of the electrochemical time in order to improve such situation, and a lower voltage can be used.

The formation mechanism of the AC electroosmotic flow is similar to that of the DC electroosmotic flow, which also drives the fluid depending on Coulomb forces resulted from the electric filed acting on charges of the electric double layer. Smoluchowski equation of electrodynamics and viscous dissipation theory can be expressed by: $Ut=-\in\times\zeta\times Et/\eta$, wherein "Ut" represents a tangential slip velocity of the electroosmotic flow, "$\in$" represents a dielectric constant of the electrolytic solution, "$\eta$" represents a viscosity coefficient of the electrode surface, "$\zeta$" represents the surface potential, and "Et" represents the tangential component of an external electric field. However, for the AC electroosmotic flow, the charges of the electric double layer are no longer in Poisson-Boltzmann balance due to rapid charge-discharge processes, which causes an electrode polarization. For this reason, the polarization charges are gathered into the induced charges on the surface of the electrodes, as is like to charge the electric double layer capacitor with a non-uniform charge distribution. The condition that happens at high frequency and there is no electrochemical current flowing through the surface of the electrode is typically called as the capacitor charging.

Currently, researches for the AC electroosmotic flow are mainly focused on parallel electrodes. In addition, electrodes with different sizes will produce asymmetric electric fields to drive the fluid move toward the larger electrode. Please refer to FIG. 1. FIG. 1 is a diagram showing a large electrode 11 and a small electrode 12 disposed on the same plane according to the prior art. When an external AC electric field is added to the electrodes 11, 12, there is an electric field formed in the electrolytic solution 13, wherein a tangential component of the electric field acts on the polarization charges of the electrodes to make the polarization charges, affected by Coulomb forces, move outward the electrodes along the surface of the electrodes. Such effect can drive the fluid on the surface of the electrode to move outward the electrodes, and is called as an electroosmotic flow streamline direction 14. Furthermore, the electrolytic solution 13 located close to the electrode surface forms a pair of vortexes overturning from outside to inside the electrodes. Since the two electrodes 11 and 12 located on the same plane have different sizes, the electric field produced by the small electrode 12 is stronger so as to drive a streamline direction 15 of the electrolytic solution 13 to move toward the large electrode 11.

Additionally, since the hydrophobic film can reduce surface viscosity coefficients, and thus the boundary slip length can be increased to reduce flow resistance. Therefore, the electroosmotic flow effects depending on surface movements can be amplified to make the velocity of the electroosmotic flow of the hydrophobic surface increase more significantly than that of the hydrophilic surface, and the slip length between the Teflon film and the water is up to 100-200 nm. Moreover, if the frequency is too high, the strong polarization charges cannot be formed by the electric double layer to cause a flowing as the charges of the electrolytic solution does not have enough time to form a tight electric double layer. If the frequency is too low, the electric double layer performs a stronger screening effect upon the external electric field, and thus the tangential electric field won't be produced and its flow velocity is equal to zero. For this reason, the frequency should be close to an inverse of the RC time, which means the charge-discharge time of a circuit including a capacitor and a resistor or can be called as $D/(\lambda L)$, wherein D represents the ion diffusion coefficient, $\lambda$ represents a thickness of the electric double layer, and L represents a separation distance between these two electrodes.

From the above, nonlinear AC electroosmotic flows resulted from 3D asymmetric electrodes capable of avoiding electrolysis and using hydrophobic surface will be provided in the present invention. As shown in FIG. 2, flow fields having horizontal or vertical vortexes are expected to be formed at the peripheries of each end of the electrodes.

SUMMARY OF THE PRESENT INVENTION

One of the objects of the present invention is to provide a microfluidic driving system. The microfluidic driving system includes a first planar electrode, a second planar electrode, and a power supply unit. The first planar electrode includes a first substrate and a first conductive layer, wherein the first conductive layer is disposed on one side of the first substrate. The second planar electrode is disposed parallel to the first planar electrode to form an accommodation space, wherein the accommodation space is provided for containing a fluid. The second planar electrode includes a second substrate and a second conductive layer, wherein the second conductive layer is disposed on one side of the second substrate. An area of the first conductive layer is different from an area of the second conductive layer, and a shape of the first conductive layer is different from a shape of the second conductive layer. The power supply unit has a first output terminal and a second output terminal respectively connected to the first conductive layer and the second conductive layer for providing an AC power, wherein an AC electric field is generated by the AC power via the first planar electrode and the second planar electrode, and the AC electric field is provided for driving the fluid to flow.

Herein the AC electric field produces a plurality of three-dimensional vortexes according to the shapes of the first conductive layer and the second conductive layer, and the plurality of three-dimensional vortexes interact with each other to form an extensional flow field.

Herein the first conductive layer includes a first hydrophobic film disposed on one side of the first conductive layer in order to reduce surface viscosity coefficients. In addition, the area of the first conductive layer is greater than the area of the second conductive layer. The second planar electrode includes a dielectric layer, and the second conductive layer is covered by the dielectric layer to prevent chemical reactions such as dielectric breakdown. The second planar electrode further includes a second hydrophobic film disposed on one side of the dielectric layer in order to reduce surface viscosity coefficients. The shape of the second conductive layer can be a rectangle, a rectangle with two protrusions (RWTP), an H shape, or a non-symmetrical shape.

A frequency of the AC power provided by the power supply unit is in between 40 KHz and 220 KHz; and a root-mean-square voltage of the AC power is in between 280 Vrms and 340 Vrms. The root mean square voltage Vrms is actually called as a root-mean-square value or an RMS value of the voltage, that is, a square root of an average for a set of statistical voltage data squared; $RMS=[(X1^2+X2^2+ \ldots +Xn^2)/n]^{1/2}$.

The microfluidic driving system of the present invention further includes a first planar electrode, a second planar electrode, a power supply unit, a third planar electrode, a fourth planar electrode, and a detection module. The detection module includes a light-emitting component and an analysis unit, which is provided for detecting fluid samples flowing in the accommodation space. The manufacturing manner of the third planar electrode and the fourth planar electrode is the same as that of the first planar electrode and the second planar electrode, which is provided for moving and absorbing a first fluid of the fluid and a second fluid of the fluid. Herein the second planar electrode, the third planar electrode, and the fourth planar electrode is covered by the first planar electrode to form the accommodation space for accommodating the first fluid and the second fluid. The power supply unit further includes a third output terminal and a fourth output terminal respectively connected to the third conductive layer and the fourth conductive layer for providing the AC power. First, the first planar electrode is electrified by the first output terminal of the power supply unit, and then the third planar electrode and the fourth planar electrode are electrified by turns to produce the AC electric field. The AC electric field is applied to move the first fluid and the second fluid. After that, the second planar electrode is electrified in order to mix the first fluid and the second fluid. Finally, a detection is performed upon a mixture of the fluids through the detection module. Namely, a microfluidic driving, mixing, and detection system is suitable for detecting the fluid or fluids with a pre-treatment mixture.

As abovementioned, the microfluidic driving system disclosed in the present invention has one or more of the following advantages:

(1) The microfluidic driving system drives the fluid via the AC electroosmotic flow, which can effectively avoid the problem of bubbles resulted from electrolyses.

(2) The microfluidic driving system protects the microelectrodes by means of dielectric layer, such that the microelectrodes can withstand a greater voltage to prevent electrochemical reactions such as dielectric breakdown, which can effectively extend the life-time.

(3) The microfluidic driving system makes use of hydrophobic films to help to generate slip lengths in order to reduce flow resistance, which can effectively avoid the fluid surface adsorption problems to improve the performance of the AC electroosmotic flow.

(4) The microfluidic driving system can produce flow field structures with different types by changing the shapes of the conductive layers of the planar electrodes, and it has more availability under different operating conditions.

(5) When the frequency of the AC power adopted in the microfluidic driving system is close to an inverse of an electrochemical reaction time (RC time), a maximum energy can be produced.

(6) The microfluidic driving system can be used to achieve functions such as fluid (e.g., DI-water) driving, mixing, detection, or micro-pump.

(7) The microfluidic driving system can produce flow field structures with three-dimensional vortexes, which can effectively improve a mixing performance of mixers.

Objects of the present invention are not limited to those mentioned above, and other objects of the present invention will be apparently understood by those skilled in the art through the following description.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF THE EMBODIMENTS

Figure 1:
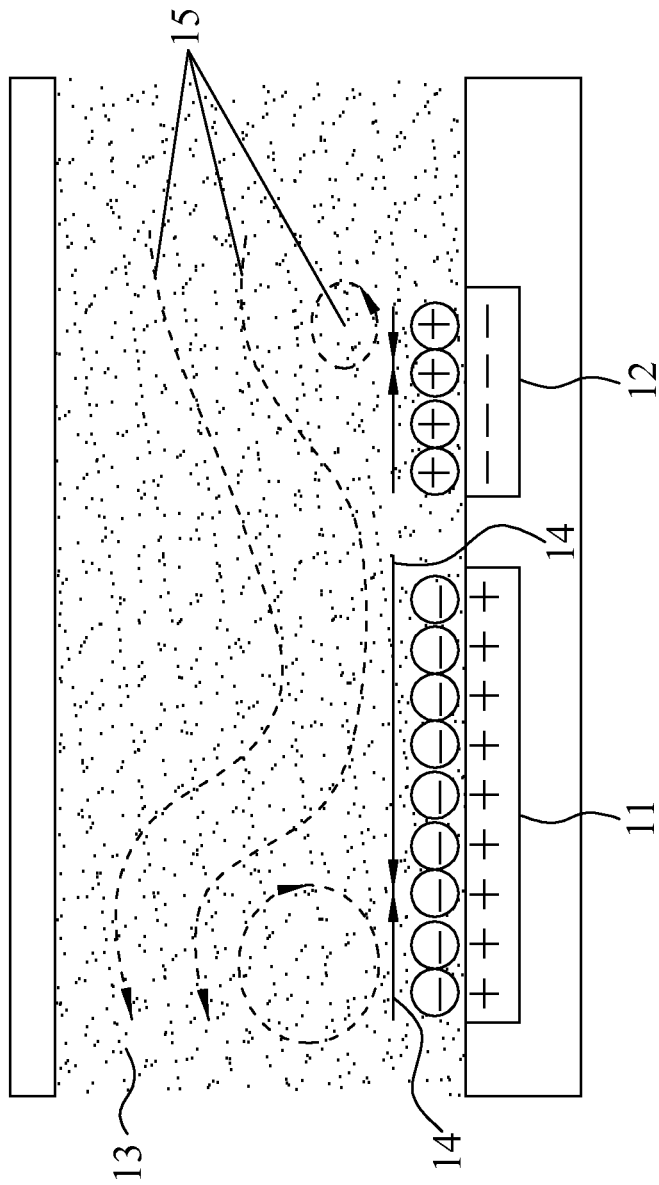
FIG. 1 is a diagram showing a large electrode 11 and a small electrode 12 disposed on the same plane according to the prior art.
Figure 2:
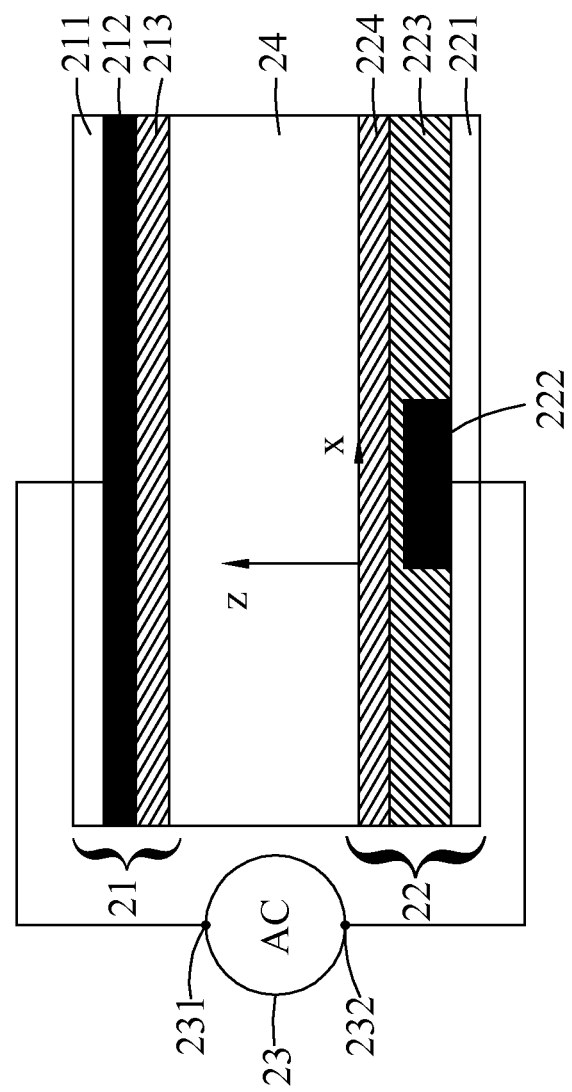
FIG. 2 is a diagram of a microfluidic driving system according to a first embodiment of the present invention.

Please refer to FIG. 2. FIG. 2 is a diagram of a microfluidic driving system according to a first embodiment of the present invention. As shown in FIG. 2, the microfluidic driving system includes a first planar electrode 21, a second planar electrode 22, and a power supply unit 23. The second planar electrode 22 is disposed parallel to the first planar electrode 21 and face-to-face with the first planar electrode 21 to form an accommodation space 24.

The first planar electrode 21 may include a first substrate 211, a first conductive layer 212, and a first hydrophobic film 213. The first substrate 211 may be a glass substrate, the first conductive layer 212 may be an ITO layer, and the first hydrophobic film 213 may be a Teflon film. Herein the ITO layer is disposed in one side of the glass substrate, and then the Teflon film is coated on the surface of the ITO layer to form the first planar electrode 21.

The second planar electrode 22 may include a second substrate 221, a second conductive layer 222, a dielectric layer 223, and a second hydrophobic film 224. The second substrate 221 may be a glass substrate, the second conductive layer 222 may be an ITO layer, wherein the area of the second conductive layer 222 is different from the area of the first conductive layer 212, and the shape of the second conductive layer 222 is different from the shape of the first conductive layer 212. The dielectric layer 223 may be a polymer film with Parylenen C, in order to prevent chemical reactions such as dielectric breakdown. The second hydrophobic film 224 may be a Teflon film. Herein the ITO layer is disposed in one side of the glass substrate, a polymer film with Parylenen C is coated on the surface of the ITO layer, and the Teflon film is coated on the surface of the polymer film with Parylenen C to form the second planar electrode 22.

The main purpose for disposing the first hydrophobic film 213 and the second hydrophobic film 224 in the present invention is to reduce surface viscosity coefficients. As a result, the boundary slip length can be increased to reduce flow resistance, and the electroosmotic flow effects depending on surface movements is amplified to make the velocity of the electroosmotic flow of the hydrophobic surface increase more significantly than that of the hydrophilic surface. The slip length between the Teflon film and the water is up to 100-200 nm.

The power supply unit 23 may have a first output terminal 231 and a second output terminal 232. The first output terminal 231 is connected with the first conductive layer 212 of the first planar electrode 21, and the second output terminal 232 is connected with the second conductive layer 222 of the second planar electrode 22 so as to provide an AC power. As a result, the first planar electrode 21 and the second planar electrode 22 produce an AC electric field via the AC power, and the microfluidic driving system drives the fluid to flow by means of the AC electric field. This experimental solution can be DI-water, and fluorescent particles (which has a particle size of 1 μm) allocating with an inverted fluorescent microscope and a digital camera system can be used to observe the fluid flow. Herein a frequency of the AC power can be in between 40 KHz and 220 KHz, and a root-mean-square voltage of the AC power can be in between 280 Vrms and 340 Vrms.

The AC electric field may produce a plurality of three-dimensional vortexes according to the shapes of the first conductive layer 212 of the first planar electrode 21 and the second conductive layer 222 of the second planar electrode 22. When the plurality of three-dimensional vortexes are interacted with each other, a extensional flow field can be formed. Therefore, the fluid can make use of the extensional flow filed to move in the microfluidic driving system.

Figure 3A:
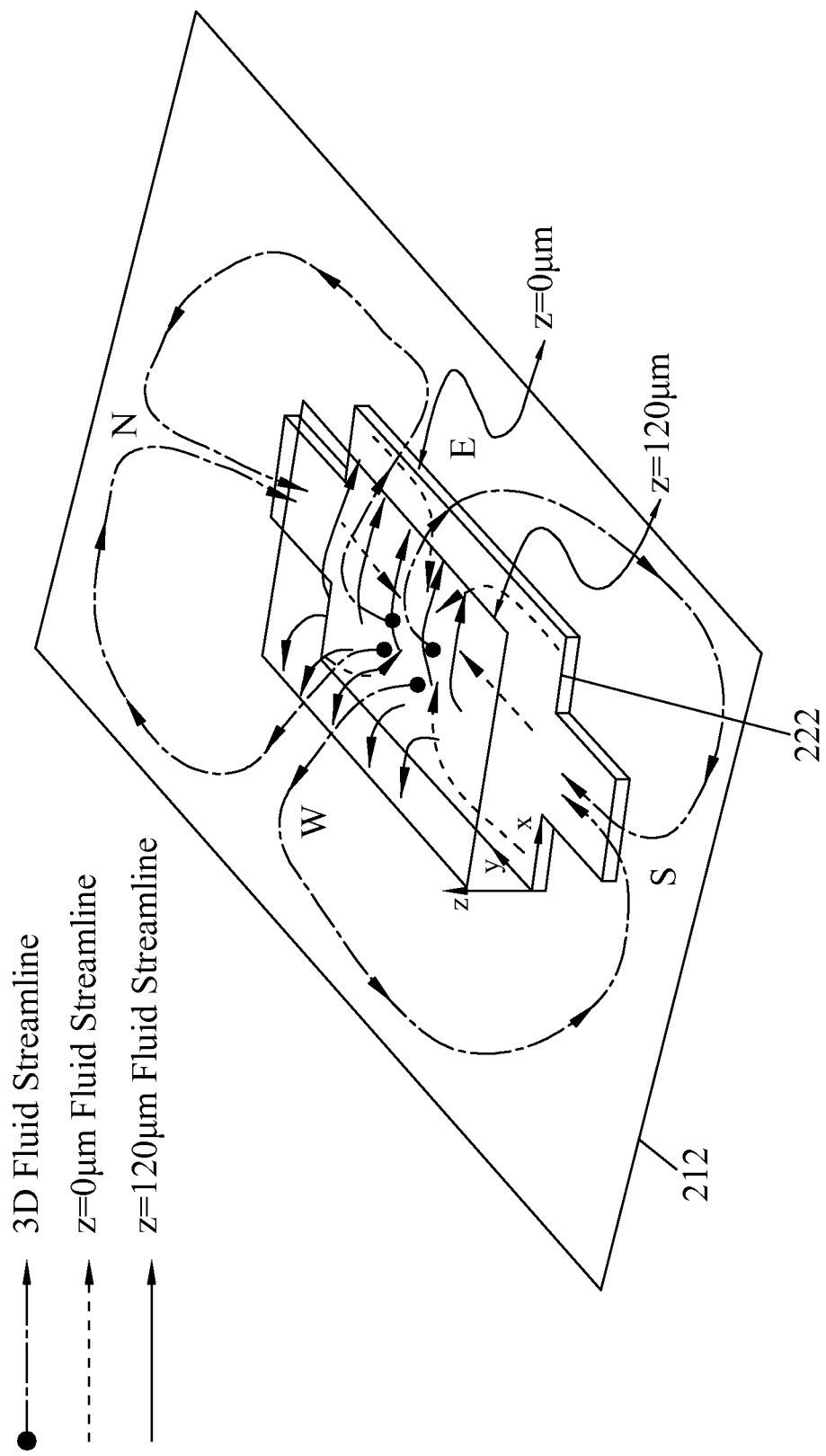
FIG. 3A is a diagram of a microfluidic driving system according to a second embodiment of the present invention.

Please refer to FIG. 3A. FIG. 3A is a diagram of a microfluidic driving system according to a second embodiment of the present invention. As shown in FIG. 3A, the shape of the first conductive layer 212 of the first planar electrode is a rectangle, the shape of the second conductive layer 222 of the second planar electrode is a rectangle with two protrusions (RWTP), and the area of the first conductive layer 212 is greater than the area of the second conductive layer 222, such that a non-uniform electric field may be produced by these two asymmetric conductive layers. In this embodiment, the RMS voltage of the AC power is 340 Vrms, and the frequency of the AC power is 140 KHz.

Figure 3B:
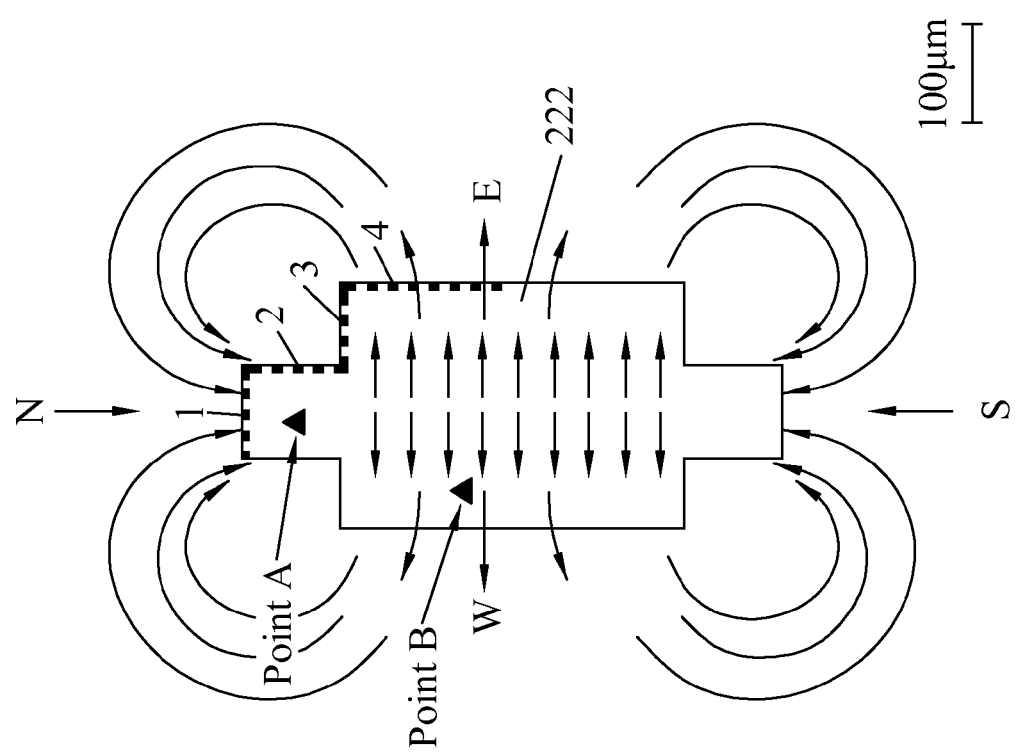
FIG. 3B is a diagram illustrating a flow field of the microfluidic driving system according to a second embodiment of the present invention.

Please refer to FIG. 3B. FIG. 3B is a diagram illustrating a flow field of the microfluidic driving system according to a second embodiment of the present invention. The second conductive layer 222 is used as the datum plane (z=0 μm), and thus the relative position of the first conductive layer 212 is located at z=120 μm. The fluid flows into the center zone of the second conductive layer 222 from both the South (S) and the North (N) directions. After the fluid flows meet with each other, the fluid flows out from both the East (E) and the West (W) directions to form a extensional flow field with an East-West direction, and produces a pair of two opposite vortexes at the outside of the second conductive layer 222. The tangential velocity of the vortexes produced by the flow field can reach 0.548 mm/s at a location that its radius equaling 200 μm (i.e., Point A), and the tangential velocity of the vortexes can even reach 1.216 mm/s at a location near the edge of the second electrode (i.e., Point B).

Be noted that the extensional flow field is a result under the staggered rectifier of these four three-dimensional vortexes. Hence, under a capacitor charging mode, the charges of the AC electroosmotic flow having the same polarity as the electric field of the electrode will be pushed away from the electrode, that is to say, the negative charges will be pushed away from the negative electrode, vice versa. Since the second conductive layer 222 has a smaller area, it has a larger electric field intensity than that of the upper first conductive layer 212. As a result, the fluid velocity driven by the push-ups of the second conductive layer 222 is faster than the fluid velocity driven by push-downs of the first conductive layer 212, and most of the vertical flow fields between these two electrodes are upward until the average vertical velocity is zero at z=120 μm. Furthermore, because the fluid located at neighboring regions of the second conductive layer 222 (z<120 μm) moves upwards, the fluid outside the neighboring regions moves inward, which is shown as the streamlines located at z=0 μm in FIG. 3A, such that the fluid moves upwards and inward. At z=120 μm, the fluid outside the neighboring regions flows out due to the vertical velocity being almost zero and the influence of the horizontal electric filed (the x-y direction). Since there is almost no z-direction electric field outside the neighboring regions of the second conductive layer 222, the fluid outside the neighboring regions of the second conductive layer 222 moves downward by the charges pushed away from the electric field of the first conductive layer 212. At the same time, on the x-y plane (as far as the flow field on the upper-right corner is concerned), the electric field of the second conductive layer 222 on the x-direction (i.e., the position 4 in FIG. 3B, which is also represented by thick dashed lines) is stronger than the electric filed on the y-direction (i.e., the positions 1 and 3) due to it has a shorter length on the x direction. Hence, the fluid will be pushed from the neighboring regions of the second conductive layer 222 to the West direction and flows out from the electrode, and then the fluid is brought into the second conductive layer 222 from the North direction so as to form an anti-clock vortex. At the same time, at the protruding part of the second conductive layer 222, the x-direction electric field located at the position 2 is much stronger than the y-direction electric field located at the position 3, such that the fluid of this region also flows along the anti-clock direction to enhance the original vortex in order to form an obvious vortex, which can be observed in FIG. 3B.

Figure 3C:
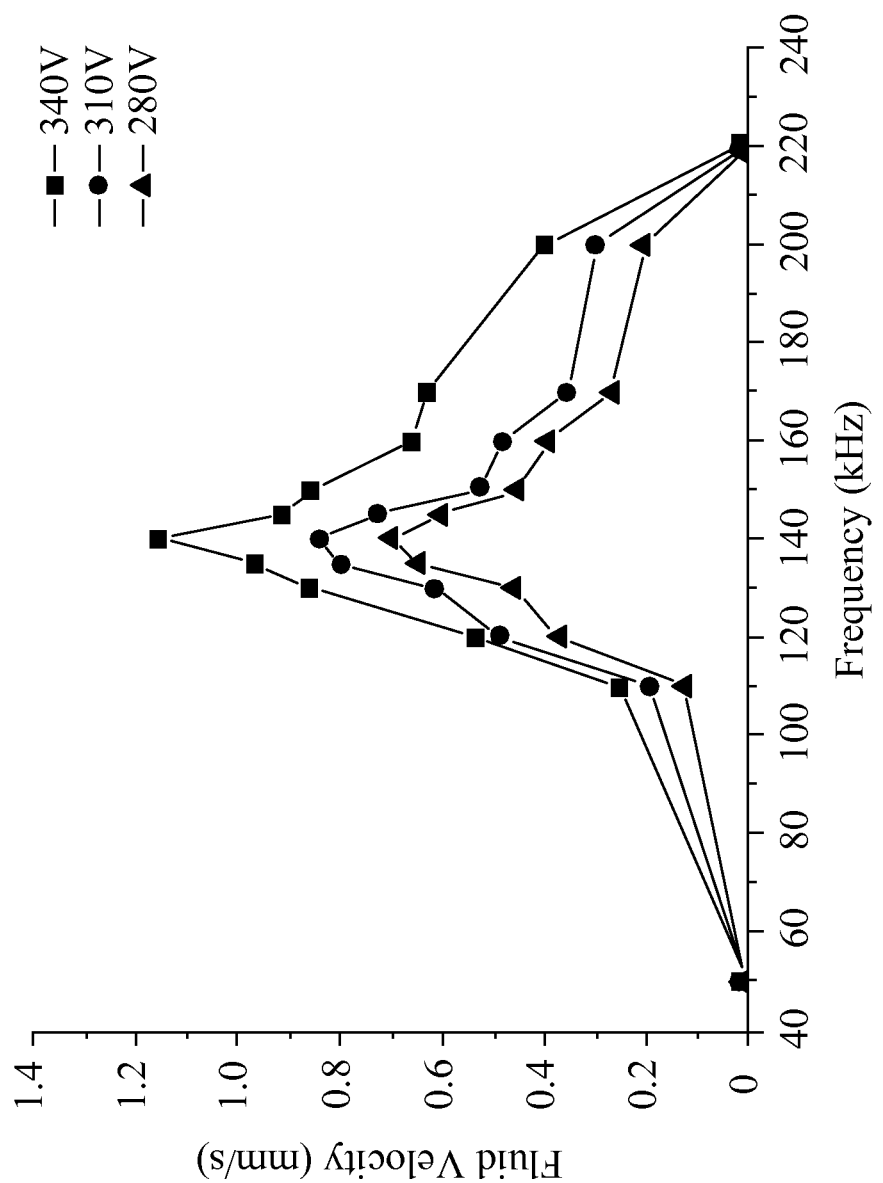
FIG. 3C is a diagram illustrating a relationship between a fluid velocity and an external electric field frequency of the microfluidic driving system according to the present invention.

Please refer to FIG. 3C. FIG. 3C is a diagram illustrating a relationship between a fluid velocity and an external electric field frequency of the microfluidic driving system according to the present invention. In FIG. 3C, the measurement is for describing the relationship between the fluid velocity located near the edge of the second conductive layer 222 (i.e., Point B) and the external electric field frequency. As can be seen from the measurement result, the average fluid velocity of the AC electroosmotic flow as well as the frequency shows a Gaussian distribution. That is, the maximum value of the average velocity for the system occurs at the frequency of 140 KHz, and the average velocity for the system increases as the voltage increases. The higher resistances of the ITO layer, the polymer film with Parylenen C, and the Teflon layer will result in a larger voltage. Under the maximum operating voltage, the fluid temperature measured by the fluorescent brightness is about 42° C., which is still much smaller than 60° C., being the denaturation temperature of most organism protein. Therefore, it can be applied to biochips.

Figure 4A:
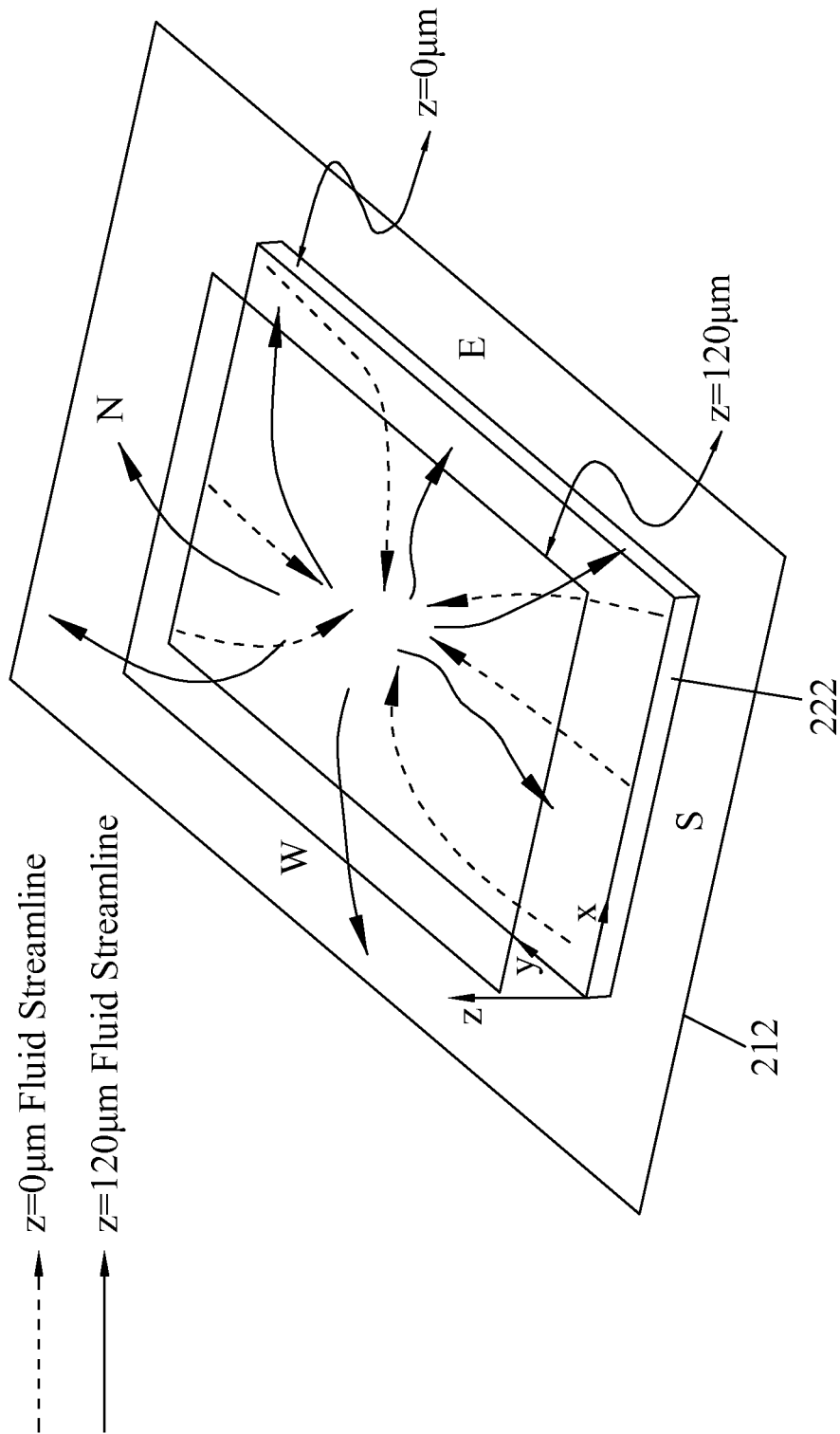
FIG. 4A is a diagram of a microfluidic driving system according to a third embodiment of the present invention.

Please refer to FIG. 4A, which is a diagram of a microfluidic driving system according to a third embodiment of the present invention. In FIG. 4A, the shape of the first conductive layer 212 is a rectangle, and the shape of the second conductive layer 222 is also a rectangle. Since the area of the first conductive layer 212 is greater than the area of the second conductive layer 222, non-uniform electric fields can be produced by means of these two asymmetric conductive layers. In this embodiment, the RMS voltage of the AC power is 340 Vrms, and the frequency of the AC power is 140 KHz.

Figure 4B:
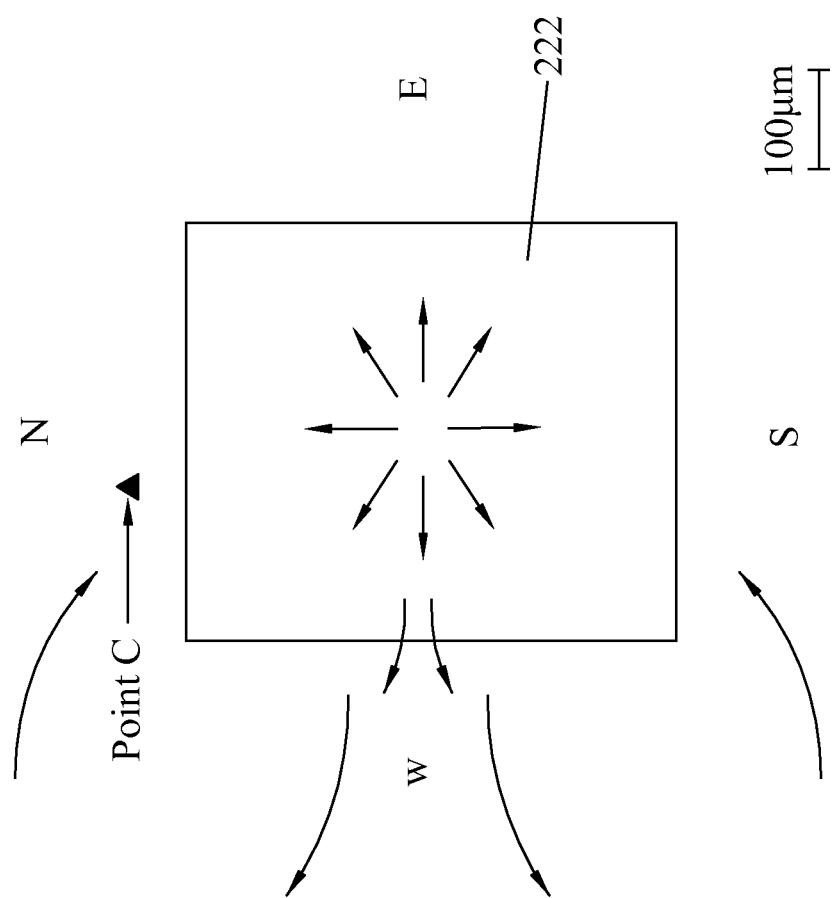
FIG. 4B is a diagram illustrating a flow field of the microfluidic driving system according to a third embodiment of the present invention.

Please refer to FIG. 4B, which is a diagram illustrating a flow field of the microfluidic driving system according to a third embodiment of the present invention. Compared with the abovementioned second embodiment, because the protruding part of the second conductive layer 222 vanishes, the effect for enhancing the vortexes by the partial electric field also vanishes, as is shown in FIG. 4B. The flow field flows outward from the center zone of the second conductive layer 222 to its surrounds, and the intensity of these two corresponding vortexes generated outside the second conductive layer 222 becomes much weaker, such that these two corresponding vortexes are not obvious. Such phenomenon is resulted from the reason that the second conductive layer 222 is a rectangle and its length on the x-direction is similar to its length on the y-direction, and thus their electric fields on the x-direction and on the y-direction have a slight difference. In addition, because there is no partial electric field variations produced by the protruding part of the electrode, it is hard to form a strong vortex and the fluid cannot be brought into the electrode from the North direction. As a result, the flow field moves upwards by the push-ups of the stronger z-direction electric field, and then overturns to flow out to the surrounds of the second conductive layer 222, as is shown in FIG. 4A. Be noted that at the location whose radius equaling 200 μm, its maximum tangential velocity is substantially equal to 0.057 mm/s (i.e., Point C), which is about $\frac{1}{10}$ of the velocity measured at its corresponding position (i.e., Point A) shown in FIG. 3B adopting the RWTP electrode.

Figure 5A:
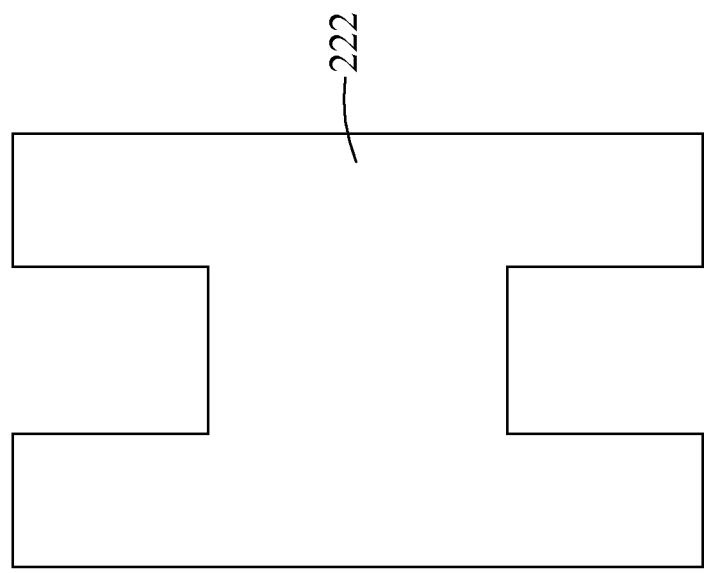
FIG. 5A is diagram of a microfluidic driving system according to a fourth embodiment of the present invention.
Figure 5B:
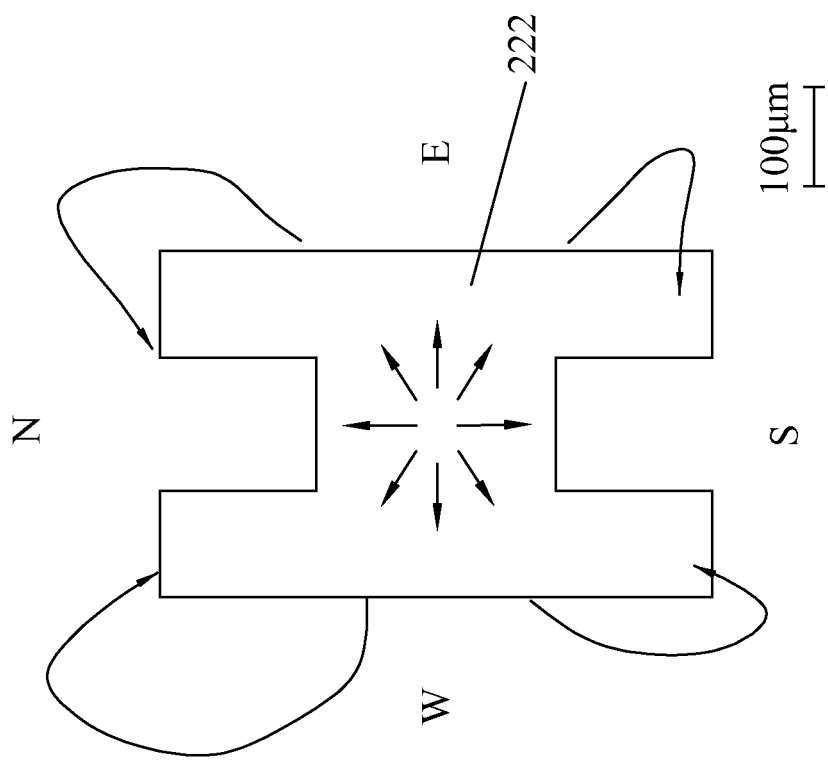
FIG. 5B is a diagram illustrating a flow field of the microfluidic driving system according to a fourth embodiment of the present invention.

Please refer to FIG. 5A, which is diagram of a microfluidic driving system according to a fourth embodiment of the present invention. Please also refer to FIG. 5B, which is a diagram illustrating a flow field of the microfluidic driving system according to a fourth embodiment of the present invention. In this embodiment, the shape of the first conductive layer 212 is a rectangle, and the shape of the second conductive layer 222 is an H shape. When the shape of the second conductive layer 222 is changed, the distribution of the flow field will vary. Therefore, non-uniform electric fields can be produced by means of these two asymmetric conductive layers.

Figure 6A:
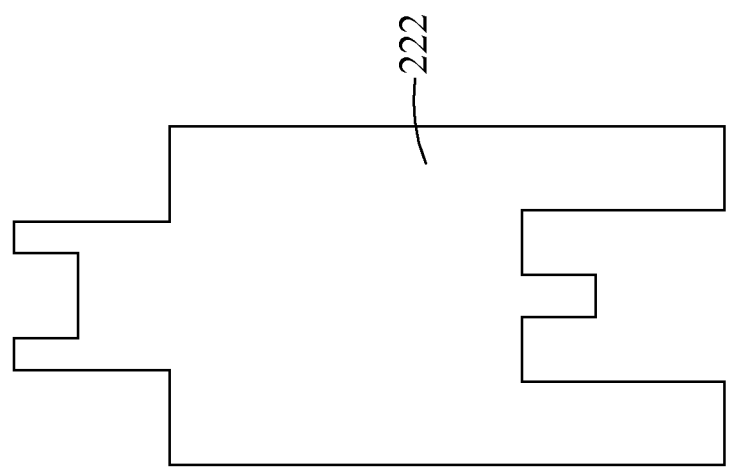
FIG. 6A is diagram of a microfluidic driving system according to a fifth embodiment of the present invention.
Figure 6B:
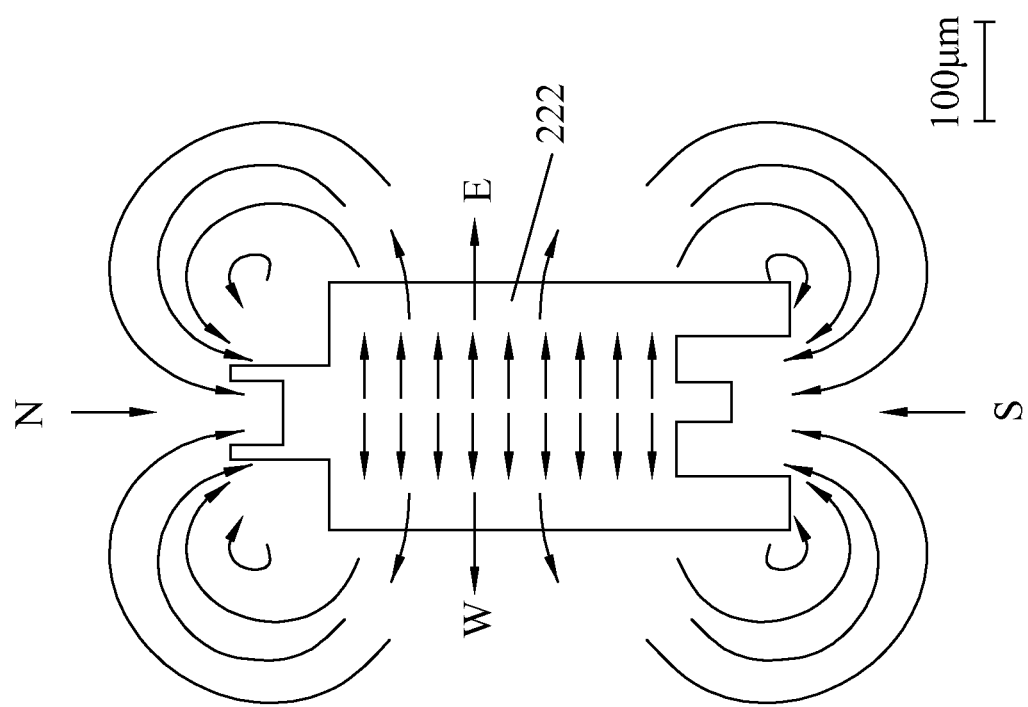
FIG. 6B is a diagram illustrating a flow field of the microfluidic driving system according to a fifth embodiment of the present invention.

Please refer to FIG. 6A, which is diagram of a microfluidic driving system according to a fifth embodiment of the present invention. Please refer to FIG. 6B, which is a diagram illustrating a flow field of the microfluidic driving system according to a fifth embodiment of the present invention. In this embodiment, the shape of the first conductive layer is a rectangle, and the shape of the second conductive layer 222 is an asymmetric shape. When the shape of the second conductive layer 222 is changed, the distribution of the flow filed will vary due to the electric field distributions. Therefore, non-uniform electric fields can be produced by means of these two asymmetric conductive layers. As shown in FIG. 6B, four obvious vortexes can be observed through the shape of the second conductive layer 222. Under the staggered rectifier influence of these four vortexes, the microfluidic driving system may obtain an optimum mixing performance.

The microfluidic driving system plays an indispensable component in the micro total analysis system, and the microfluidic driving system disclosed in the present invention has extraordinary advantages when being applied to biochips, such as simple timing control, less consumption of sample reagents, and single-chip design capable of being applied to various experiment demands. In the following demonstrations, a combination of originally separated experimental processes, such as an electrowetting technology for digital microfluidic movement and a non-invasive optical detection device, is integrated on the same chip to replace traditional manual operations. An embodiment for such multi-function biochip is described as below.

Figure 7:
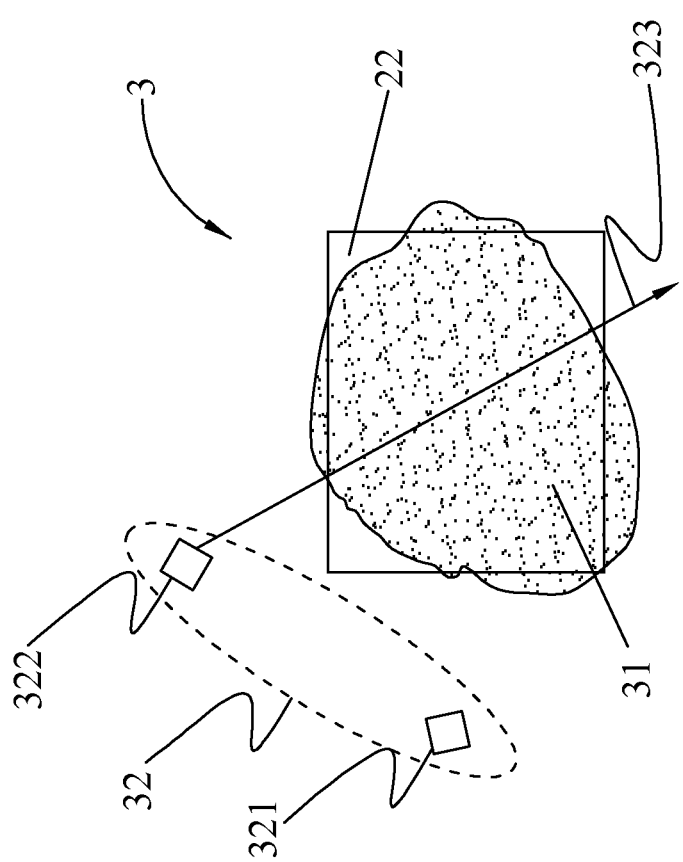
FIG. 7 is diagram of a microfluidic driving system according to a sixth embodiment of the present invention.

Please refer to FIG. 7, which is diagram of a microfluidic driving system according to a sixth embodiment of the present invention. In FIG. 7, a fluid sample 31 for carrying a fluid, a microfluidic driving system, and at least a detection module 32 are provided. Herein the microfluidic driving system is a mixed area and includes a first planar electrode as a conductive upper plate (such as, the first planar electrode 21 in the first embodiment) and a second planar electrode 22. The detection module 32 includes a first analysis unit 321, and a light-emitting component 322 and its detection light 323. The fluid sample 31 is placed on the microfluidic driving system for performing a mixing operation when operated. After the fluid is driven by the AC power continuously, and the detection light 323 of the light-emitting component 322 is inserted into the fluid sample 31 to receive a spectral feedback signal, the data is outputted by the analysis unit 321 so as to implement the demonstration embodiment of the system 3 with a microfluidic mixing and detection capacity.

Figure 8:
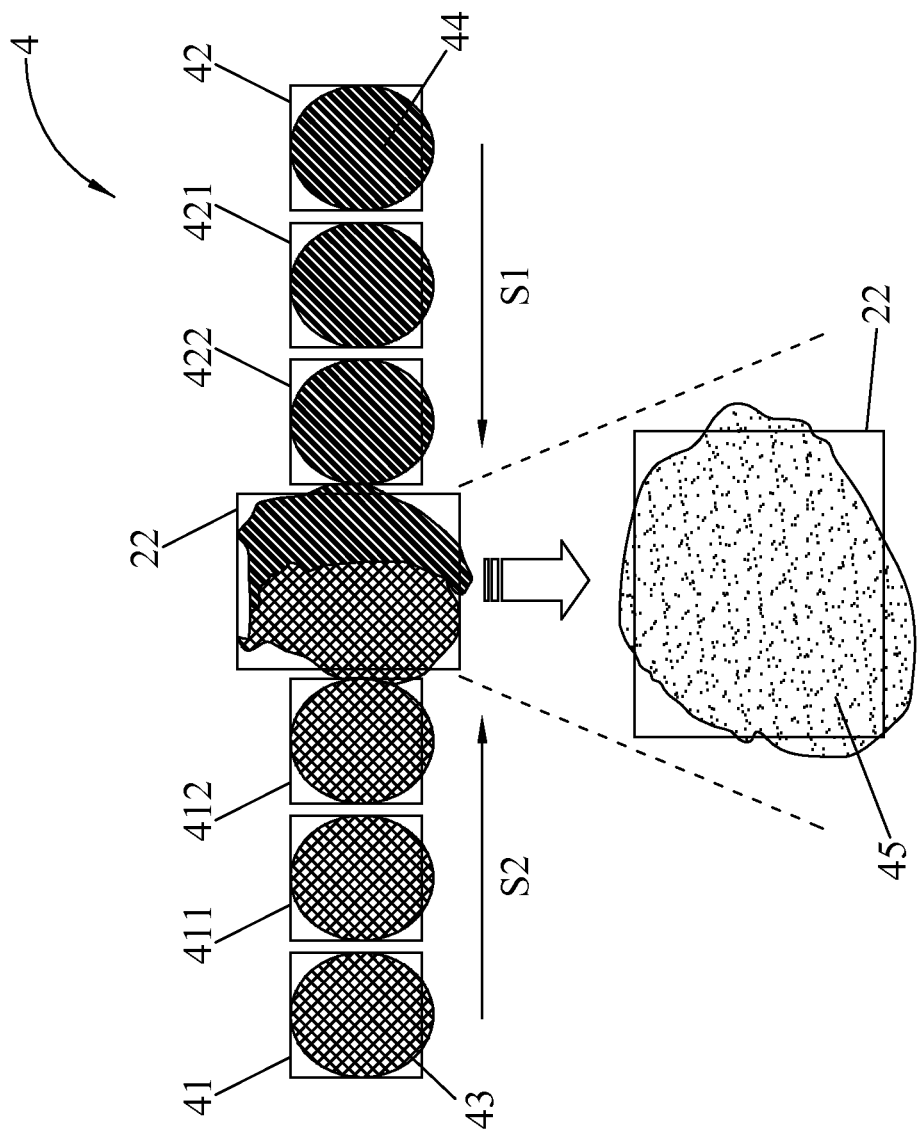
FIG. 8 is diagram of a microfluidic driving system according to a seventh embodiment of the present invention.

Please refer to FIG. 8, which is diagram of a microfluidic driving system according to a seventh embodiment of the present invention. In FIG. 8, a conductive upper plate (such as the first planar electrode 21 in the first embodiment) coated on a plurality of third planar electrodes 41, a plurality of fourth planar electrodes 42, and a second planar electrode 22 to form an accommodation space, wherein the accommodation space is used for containing a first fluid 43 and a second fluid 44. After the first fluid 43 and the second fluid 44 are respectively enabled to be adsorbed by the third planar electrode 41 and the fourth planar electrode 42, sequentially enable the electrode 41, the electrode 411, and the electrode 412 so as to make the first fluid 43 flow to the second planar electrode 22, wherein the streamline direction of the first fluid 43 is denoted as S1. At the same time, the electrode 42, the electrode 421, and the electrode 423 at the other side also form the streamline direction S2 of the second fluid 44. Finally, when the first fluid 43 and the second fluid 44 are moved near the second planar electrode 22, turn off all of the third planar electrodes 41, 411, and 412 and all of the fourth planar electrodes 42, 422, and 423 and only enable the second planar electrode 22 in order to mix the first fluid 43 and the second fluid 44. After that, a mixed fluid sample 45 is an implementation of the demonstration embodiment of the system 4 with a microfluidic flowing and mixing capacity.

Figure 9:
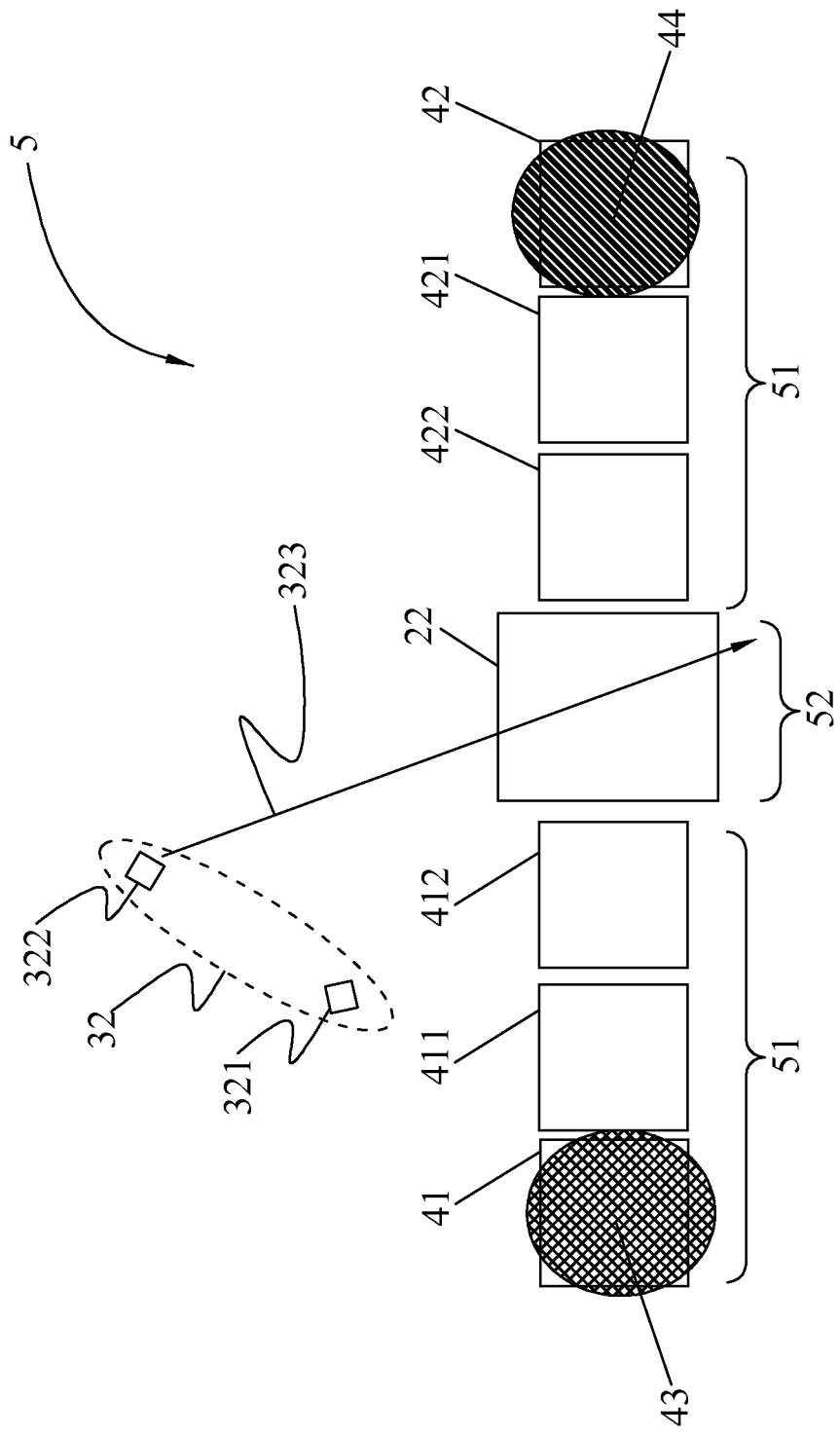
FIG. 9 is diagram of a microfluidic driving system according to an eighth embodiment of the present invention.

Please refer to FIG. 9, which is diagram of a microfluidic driving system according to an eighth embodiment of the present invention. In FIG. 9, the system 5 with a microfluidic flowing, mixing, and detection capacity includes a conductive upper plate (such as, the first planar electrode 21 in the first embodiment) a plurality of third planar electrodes 41, 411, and 412, a plurality of fourth planar electrodes 42, 421, and 422, and a second planar electrode 22 as well as a detection module 32. At first, the first fluid 43 and the second fluid 44 are simultaneously placed on two sides of the third planar electrode 41 and the fourth planar electrode 42 (please see the positions marked in FIG. 9), and then sequentially enable the third planar electrodes 41, 411, and 412 as well as the fourth planar electrodes 42, 421, and 422, such that both of the first fluid 43 and the second fluid 44 move to the second planar electrode 22 so as to form a microfluidic flow area 51 (please also refer to the streamline directions S1 and S2 shown in FIG. 8). Finally, all of the electrodes are turned off except for the second planar electrode 22 in order to achieve the microfluidic mixed area 52. At this time, after the detection light 323 of the light-emitting component 322 is inserted into the fluid to receive a spectral feedback signal, the data is outputted by the analysis unit 321 so as to complete the job of microfluidic detection. The abovementioned means the demonstration embodiment of the system 5 with a microfluidic flowing, mixing and detection capacity.

In the aforementioned FIG. 7, FIG. 8, and FIG. 9, the area of the first planar electrode 21 is greater than the area of the second planar electrode 22, the third planar electrode 41, and the fourth planar electrode 42. Each of the conductive layers of the electrodes is preferably implemented by a metal material, and a dielectric layer is coated on the surface of the electrode in order to prevent the fluid sample from boiling or electrolytic. In addition, a thin hydrophobic film is coated on the surface of the dielectric layer in order to improve the flowing phenomena. Each of the fluid, the first fluid 43, and the second fluid 44 are typically a solution having at least one samples, wherein these samples are usually bacteria, viruses, cells, protein molecules, drug molecules, DNA molecules, RNA molecules or chemical molecules. For example, the first fluid 43 is a sample solution and the second fluid 44 is a marker antibody solution, and thus a mixed fluid 45 can be obtained for detection. Herein the markers of the marker antibody are typically fluorescent dyes, nano-particles, quantum particles or other light-emitting dyes. The light-emitting component is typically a laser, the ultra-violet or infrared light related components in order to encourage the markers radiate.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A microfluidic driving system, comprising:
a first planar electrode, comprising:
   a first substrate; and
   a first conductive layer disposed on one side of the first substrate;
a second planar electrode disposed parallel to the first planar electrode and face-to-face with the first planar electrode to form an accommodation space, the accommodation space being provided for accommodating a fluid, the second planar electrode comprising:
   a second substrate; and
   a second conductive layer disposed on one side of the second substrate, an area of the first conductive layer being different from an area of the second conductive layer, and a shape of the first conductive layer being asymmetric from a shape of the second conductive layer;
a power supply unit having a first output terminal and a second output terminal respectively connected to the first conductive layer and the second conductive layer for providing an alternating current (AC) power, a non-uniform AC electric field being generated by the AC power via the asymmetric shape between the first planar electrode and the second planar electrode, and the AC electric field being provided for driving the fluid to flow via an AC electro osmotic flow, wherein the AC electric field produces a plurality of three-dimensional vortexes according to the shapes of the first conductive layer and the second conductive layer, and the plurality of three-dimensional vortexes are interacted with each other to form an extensional flow field;
a third planar electrode having a third conductive layer and being coplanar with the second planar electrode, and the third planar electrode being disposed on one side of the second planar electrode and providing for moving and absorbing a first fluid of the fluid; and
a fourth planar electrode having a fourth conductive layer and being coplanar with the second planar electrode, and the fourth planar electrode being disposed correspondingly to the third planar electrode and providing for moving and absorbing a second fluid of the fluid;
wherein the power supply unit further comprises a third output terminal and a fourth output terminal respectively connected to the third conductive layer and the fourth conductive layer for providing the AC power; and the first planar electrode, the third planar electrode, and the fourth planar electrode are electrified alternatively to produce the AC electric field in order to move the first fluid and the second fluid; and then the second planar electrode is electrified in order to mix the first fluid and the second fluid.

2. The microfluidic driving system of claim 1, wherein each of the first conductive layer and the second conductive layer is a metal material.

3. The microfluidic driving system of claim 1, wherein the area of the first conductive layer is greater than the area of the second conductive layer.

4. The microfluidic driving system of claim 1, wherein the second planar electrode further comprises a dielectric layer and the second conductive layer is covered by the dielectric layer to prevent dielectric breakdown of chemical reactions.

5. The microfluidic driving system of claim 1, wherein the first planar electrode further comprises a first hydrophobic film, and the first hydrophobic film is disposed to reduce surface viscosity coefficients.

6. The microfluidic driving system of claim 4, wherein the second planar electrode further comprises a hydrophobic film, and the hydrophobic film is disposed on the dielectric layer to reduce surface viscosity coefficients.

7. The microfluidic driving system of claim 1, wherein a frequency of the AC power is in between an inverse of an electrochemical reaction time (RC time).

8. The microfluidic driving system of claim 1, wherein the shape of the second conductive layer is a rectangle, a rectangle with two protrusions (RWTP), an H shape, or a non-symmetrical shape.

9. The microfluidic driving system of claim 1, further comprising a detection module provided for detecting the flowing of the fluid in the accommodation space.

10. The microfluidic driving system of claim 9, wherein the detection module further comprises a light-emitting component and an analysis unit, the light-emitting component is provided for emitting a light source and the analysis unit is inserted into a fluid sample to receive a spectral feedback signal.

* * * * *